United States Patent
Altmannsberger et al.

(10) Patent No.: US 10,353,791 B2
(45) Date of Patent: Jul. 16, 2019

(54) DYNAMICALLY CHANGING COPY POLICY

(71) Applicant: International Business Machines Corporation, Armonk, NY (US)

(72) Inventors: Thorsten Altmannsberger, Wiesbaden (DE); Katja I. Denefleh, Pfungstadt (DE); Katsuyoshi Katori, Kanagawa (JP); Sosuke Matsui, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 15/191,663

(22) Filed: Jun. 24, 2016

(65) Prior Publication Data

US 2017/0371569 A1    Dec. 28, 2017

(51) Int. Cl.
G06F 12/00 (2006.01)
G06F 11/30 (2006.01)
G06F 11/14 (2006.01)
G06F 11/20 (2006.01)

(52) U.S. Cl.
CPC ...... *G06F 11/3006* (2013.01); *G06F 11/1464* (2013.01); *G06F 11/2025* (2013.01); *G06F 11/3055* (2013.01)

(58) Field of Classification Search
None
See application file for complete search history.

(56) References Cited

U.S. PATENT DOCUMENTS

| 8,549,348 | B2 | 10/2013 | Akirav et al. |
| 9,229,829 | B2 | 1/2016 | Beeston et al. |
| 2015/0278129 | A1* | 10/2015 | Keeriyadath ........... G06F 13/18 710/41 |

* cited by examiner

*Primary Examiner* — Baboucarr Faal
(74) *Attorney, Agent, or Firm* — Gilbert Harmon, Jr.

(57) ABSTRACT

An approach for dynamically changing a copy policy associated with a cluster grid for tape storage virtualization which involves monitoring one or more statuses of a plurality of clusters associated with the cluster grid, wherein the one or more of the plurality of clusters are assigned one of a plurality of copy modes, detecting that at least one of the plurality of clusters, having a highest priority copy mode associated with the cluster grid, is unavailable, selecting an available second cluster of the plurality of clusters and changing the copy policy wherein the available second cluster is assigned the highest priority copy mode.

25 Claims, 5 Drawing Sheets

DYNAMICALLY CHANGING COPY POLICY

BACKGROUND

The present invention relates generally to the field of virtualized tape storage and more particularly to logical volume copy policies.

With modern computing technology, non-volatile storage, e.g., disk storage, can be virtualized as tape storage, e.g., magnetic tape data storage, for clients using tape storage as their backend for storing data. The TS7700 series servers, by International Business Machines Corporation, are one example of server computers capable of virtualizing tape storage for clients needing to back up their tape storage data. Clients using tape storage for storing data can write the data to cache memory of a virtualization server, such as TS7700, which can synchronously copy the data to a non-volatile form of storage, such as, but not limited to, a hard disk drive. Files of virtualized data stored on a virtualization server can be known as logical volumes.

A plurality of virtualization servers can be pooled together in a group, i.e., a cluster grid, for data backup, wherein each server is called a cluster. Each cluster in the cluster grid can be assigned one of a plurality of copy modes based on priority, and a primary cluster which the client writes data to, i.e., a tape volume cache (TVC), can assign a copy mode to each cluster. The copy modes determine how data, e.g., logical volumes, is copied to clusters in the cluster grid. In a cluster grid, the configuration of copy modes assigned to the clusters can be known as the copy policy of the cluster grid.

Some examples of copy modes can comprise, but are not limited to, Synchronous ("S mode"), RUN ("R mode") and Deferred ("D mode"). Synchronous is a copy mode where data is written to the TVC from a client and synchronously copied to another cluster in the grid which has been assigned S mode. S mode is useful for achieving a zero Recovery Point Objective (RPO) for preventing data loss, thus S mode can be considered a highest priority copy mode. RUN is a copy mode performed by the client as part of a Rewind Unload operation and can be a second highest priority copy mode. Deferred is a copy mode occurring asynchronously after the Rewind Unload operation performed by the client and can be a lowest priority copy mode.

In certain situations, data centers and cluster grids used for data backup may face the problem of being unable to achieve a zero RPO for a certain period of time, which can result in a loss of data. For example, if a cluster assigned S mode in a cluster grid is offline (due to maintenance or a hardware failure, etc.) data cannot be synchronously copied to the cluster from the TVC and zero RPO may not be met until the cluster is back online. A period of time where zero RPO cannot be met can result in a situation where data written to the TVC is not immediately backed up to another cluster and can therefore be lost.

SUMMARY

The shortcomings of the prior art are overcome, and additional advantages are provided, through the provision, in one aspect, of a first method for dynamically changing a copy policy associated with a cluster grid for tape storage virtualization. One or more statuses of a plurality of clusters associated with the cluster grid are monitored, wherein one or more of the plurality of clusters are assigned one of a plurality of copy modes. At least one of the plurality of clusters, having a highest priority copy mode associated with the cluster grid, is detected as being unavailable. An available second cluster of the plurality of clusters is selected. The copy policy is changed wherein the available second cluster is assigned the highest priority copy mode.

In one embodiment, a copy mode associated with the available second cluster is swapped with the highest priority copy mode of the at least one of the plurality of clusters. Accordingly, the highest priority cluster mode is maintained in the cluster grid.

In one embodiment, the available second cluster is selected based on at least one of a data level of the available second cluster and a priority associated with a copy mode of the available second cluster.

In one embodiment a previous copy policy associated with the cluster grid is restored responsive to a detection that the at least one of the plurality of clusters is available. Accordingly, a preferred copy policy for a cluster grid is automatically restored.

In another aspect, a second method for dynamically changing a copy policy associated with a cluster grid for tape storage virtualization is provided. One or more statuses of a plurality of clusters associated with the cluster grid are monitored by a tape volume cache (TVC) cluster, wherein one or more of the plurality of clusters are assigned one of a plurality of copy modes and data is written to the TVC cluster from a client. At least one of the plurality of clusters having a Synchronous copy mode is detected by the TVC cluster as being unavailable. An available second cluster of the plurality of clusters is selected by the TVC cluster based on at least one of a data level of the available second cluster and a priority associated with a copy mode of the available second cluster. The copy policy is changed by the TVC cluster wherein the available second cluster is assigned the Synchronous copy mode for maintaining a zero recovery point objective (RPO) for the cluster grid.

In one embodiment, a copy mode associated with the available second cluster is swapped with the Synchronous copy mode of the at least one of the plurality of clusters. Accordingly, a zero RPO is maintained for the cluster grid.

In one embodiment, a data level associated with the TVC cluster is copied, by the TVC cluster, to the available second cluster, responsive to a detection that no available clusters of the plurality of clusters have a data level equal to the data level associated with the TVC cluster.

In another aspect, a first computer program product for dynamically changing a copy policy associated with a cluster grid for tape storage virtualization is provided. The first computer program product comprises one or more computer readable storage media and program instructions stored on the one or more computer readable storage media. Program instructions are provided to monitor one or more statuses of a plurality of clusters associated with the cluster grid, wherein one or more of the plurality of clusters are assigned one of a plurality of copy modes. Program instructions are provided to detect that at least one of the plurality of clusters, having a highest priority copy mode associated with the cluster grid, is unavailable. Program instructions are provided to select an available second cluster of the plurality of clusters. Program instructions are provided to change the copy policy wherein the available second cluster is assigned the highest priority copy mode.

In a further aspect, a second computer program product for dynamically changing a copy policy associated with a cluster grid for tape storage virtualization is provided. The second computer program product comprises one or more computer readable storage media and program instructions stored on the one or more computer readable storage media.

Program instructions are provided to monitor, by a tape volume cache (TVC) cluster which a client writes data to, one or more statuses of a plurality of clusters associated with the cluster grid, wherein one or more of the plurality of clusters are assigned one of a plurality of copy modes. Program instructions are provided to detect, by the TVC cluster, that at least one of the plurality of clusters having a Synchronous copy mode is unavailable. Program instructions are provided to select, by the TVC cluster, an available second cluster of the plurality of clusters based on at least one of a data level of the available second cluster and a priority associated with a copy mode of the available second cluster. Program instructions are provided to change, by the TVC cluster, the copy policy wherein the available second cluster is assigned the Synchronous copy mode for maintaining a zero recovery point objective (RPO) for the cluster grid.

In a further aspect, a computer system for dynamically changing a copy policy associated with a cluster grid for tape storage virtualization is provided. The computer system comprises one or more computer processors, one or more computer readable storage media, and program instructions stored on the one or more computer readable storage media for execution by at least one of the one or more processors. Program instructions are provided to monitor one or more statuses of a plurality of clusters associated with the cluster grid, wherein one or more of the plurality of clusters are assigned one of a plurality of copy modes. Program instructions are provided to detect that at least one of the plurality of clusters, having a highest priority copy mode associated with the cluster grid, is unavailable. Program instructions are provided to select an available second cluster of the plurality of clusters. Program instructions are provided to change the copy policy wherein the available second cluster is assigned the highest priority copy mode.

Additional features and advantages are realized through the techniques set forth herein. Other embodiments and aspects are described in detail herein and are considered a part of the claimed invention.

DETAILED DESCRIPTION

Embodiments of the present invention recognize that cluster grids used for virtualizing tape storage need a way to maintain a zero RPO for secure data backup. Presently, a zero RPO can be met by having one or more other clusters in a cluster grid, other than the TVC, assigned the Synchronous copy mode so that data written to the TVC is synchronously copied to the other clusters. However, if those other clusters assigned S mode are offline for a period of time, zero RPO cannot be achieved for the cluster grid. Embodiments of the present invention therefore present a solution for secure data backup wherein a copy policy for a cluster grid can be dynamically configured, i.e., changed, which can ensure that a zero RPO can be achieved in an event of one or more offline S mode clusters.

In describing embodiments in detail with reference to the figures, it should be noted that references in the specification to "an embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, describing a particular feature, structure or characteristic in connection with an embodiment, one skilled in the art has the knowledge to affect such feature, structure or characteristic in connection with other embodiments whether or not explicitly described.

Figure 1:
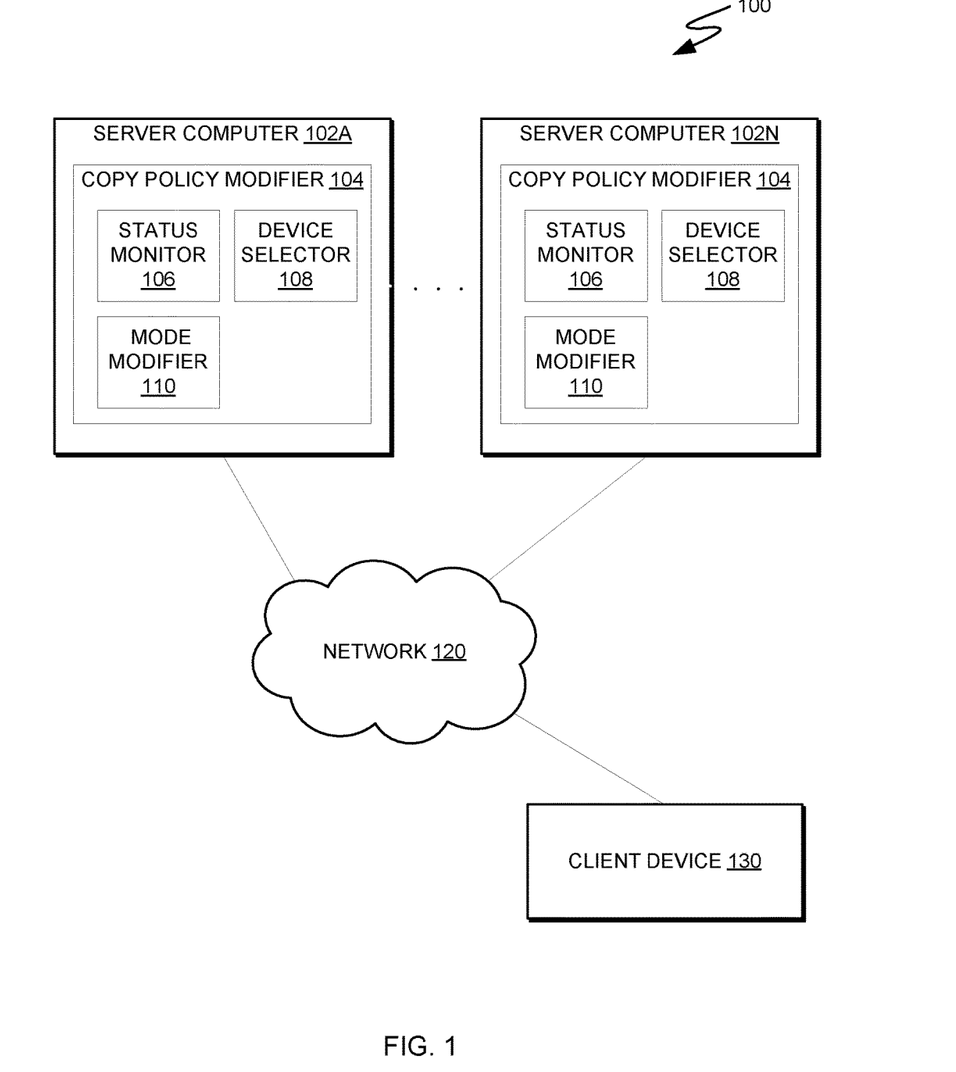
FIG. 1 is a functional block diagram illustrating a distributed data processing environment, in accordance with an embodiment of the present invention.

The present invention will now be described in detail with reference to the figures. FIG. 1 is a functional block diagram illustrating a distributed data processing environment 100, in accordance with one embodiment of the present invention. Distributed data processing environment 100 comprises server computers 102A-N and client device 130, all interconnected over network 120.

Server computers 102A-N can be a laptop computer, tablet computer, netbook computer, personal computer (PC), a desktop computer, a personal digital assistant (PDA), a smart phone, or any programmable electronic device capable of communicating with client device 130 via network 120. Server computers 102A-N can be virtualization servers such as, but not limited to, TS7700 series servers, as a cluster grid for virtualizing non-volatile storage, e.g., hard disk storage, as tape storage. Server computers 102A-N comprise copy policy modifier 104 for dynamically modifying, i.e., changing, a copy policy associated with the cluster grid. Server computers 102A-N may include internal and external hardware components, as depicted and described in further detail with respect to FIG. 4. Further, server computers 102A-N can be used interchangeably with the term "clusters" and are generally representative of any plurality of server computers.

Copy policy modifier 104 is a component of server computers 102A-N used to change a copy policy for logical volumes in the cluster grid and comprises status monitor 106, device selector 108 and mode modifier 110. Status monitor 106 can monitor server computers 102A-N comprising the cluster grid and detect when a cluster assigned a highest priority copy mode, e.g., the Synchronous copy mode, is offline or otherwise unavailable for synchronous data copy. Responsive to detecting that an S mode cluster is offline, device selector 108 can select another available (i.e., online) cluster in the grid, based on copy mode and/or cluster data levels, and mode modifier 110 can change the copy policy to have the selected cluster assigned S mode, thus maintaining a zero RPO for the cluster grid.

In various embodiments of the present invention, client device 130 can be a laptop computer, tablet computer, netbook computer, personal computer (PC), a desktop computer, a personal digital assistant (PDA), a smart phone, or any programmable electronic device capable of communicating with server computers 102A-N via network 120. Client device 130 can be a client utilizing server computers 102A-N for backing up magnetic tape data.

Client device 130 can write magnetic tape data to volatile storage, e.g., cache memory, of any of server computers 102A-N. In general, client device 130 will write data, e.g., logical volumes, to the TVC, which can be any of server computers 102A-N and can be assigned the Synchronous copy mode. The TVC, e.g., server computer 102A, will synchronously copy the data to all of the other clusters in the cluster grid (i.e., server computers 102A-N) assigned the Synchronous copy mode.

Network 120 can be, for example, a local area network (LAN), a wide area network (WAN) such as the Internet, or a combination of the two, and can include wired, wireless, or fiber optic connections. In general, network 120 can be any combination of connections and protocols that will support communications between server computers 102A-N and client device 130.

Figure 2:
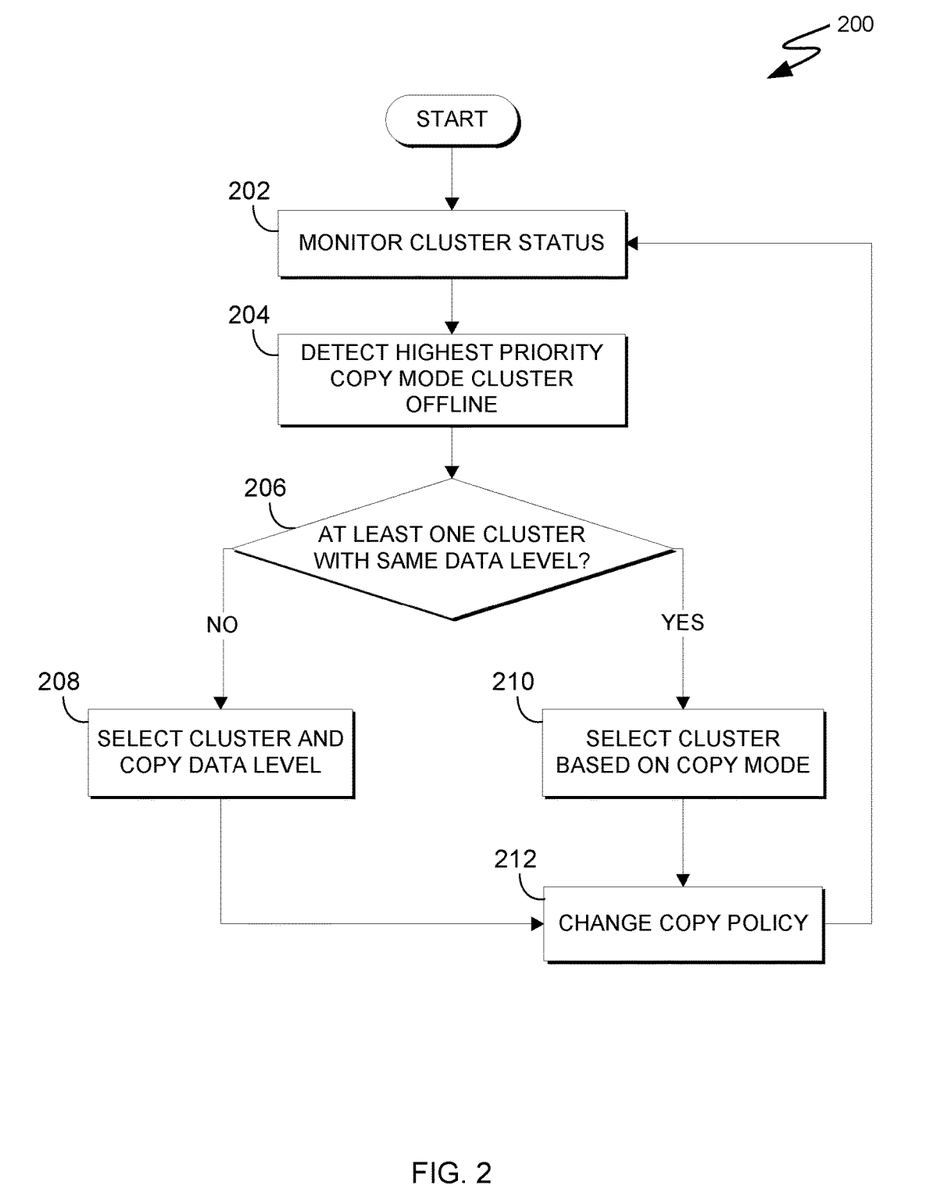
FIG. 2 is a flowchart depicting operational steps of a copy policy modifier on a server computer within the data processing environment of FIG. 1, in accordance with an embodiment of the present invention.

FIG. 2 is a flowchart depicting operational steps of copy policy modifier 104 for dynamically configuring a copy policy associated with a cluster grid, in accordance with an embodiment of the present invention. The operational steps described herein can be associated with copy policy modifier 104 running on server computer 102A, which can be the TVC for server computers 102A-N. Status monitor 106 monitors one or more availability statuses of server computers 102A-N in the cluster grid (step 202). Status monitor 106 can accomplish this by checking the availability statuses on a predetermined basis, for example, and can further be aware of respective copy modes assigned to server computers 102A-N.

Status monitor 106 detects at least one of server computers 102A-N (excluding the TVC itself, server computer 102A) which is offline and assigned a highest priority copy mode, e.g., Synchronous copy mode, associated with the cluster grid (step 204). Responsive to the detection of the at least one offline highest priority copy mode cluster, device selector 108 determines if any of the other available clusters have the same data level of logical volumes as the TVC (step 206). Data level, as the term is used herein, refers to the version of logical volumes (i.e., data files being backed up) comprising the clusters.

If device selector 108 determines that only one other available cluster in the grid has the same data level as the TVC (step 206, YES branch), device selector 108 selects the one other available cluster for highest priority copy mode assignment, e.g., Synchronous copy mode (step 210). If device selector 108 determines that more than one available cluster has the same data level as the TVC (step 206, YES branch), device selector 108 selects one of those available clusters based on copy mode (step 210). For example, if two available clusters are determined to have the same data level as the TVC and one of the available clusters is assigned the RUN copy mode while the other is assigned the Deferred copy mode, device selector 108 will select the available cluster assigned the RUN copy mode because the selected cluster has a higher copy priority based on copy mode.

Mode modifier 110 changes the copy policy associated with the cluster grid (step 212). The selected cluster can be assigned the highest priority copy mode, e.g., S mode, so that a zero RPO can be achieved for the cluster grid. In changing the copy policy associated with the cluster grid (step 212), mode modifier 110 can swap copy modes between the offline cluster, e.g., a cluster assigned Synchronous copy mode, and the selected cluster so that the selected cluster is assigned the Synchronous copy mode instead. After changing the copy policy (step 212), status monitor 106 continues monitoring the availability statuses of server computers 102A-N in the cluster grid (step 202).

If device selector 108 determines that no other available clusters have the same data level as the TVC (step 206, NO branch), device selector 108 selects an available cluster, e.g., based on assigned copy mode as previously described, and copies logical volumes comprising the TVC to the selected cluster so that the selected cluster has the same data level for logical volumes as the TVC. Mode modifier 110 subsequently changes the copy policy associated with the cluster grid (step 212), wherein the change can comprise a swap of copy modes as previously described to maintain a zero RPO.

It should be noted that device selector 108 can select a cluster for changing the copy policy based on the distance of the cluster from the TVC. For example, if an S mode cluster is offline and device selector 108 is selecting between two other clusters, both having the same copy priority (e.g., RUN copy mode) and both having the same data level as the TVC, device selector 108 can select one of the two other clusters based on which of the two other clusters is closer to the TVC, for optimal write performance. Additionally, according to some embodiments, some clusters in the cluster grid can be exempt from selection according to predetermined criteria, e.g., the exempt clusters are located beyond a threshold distance away from the TVC, etc.

Figure 3A:
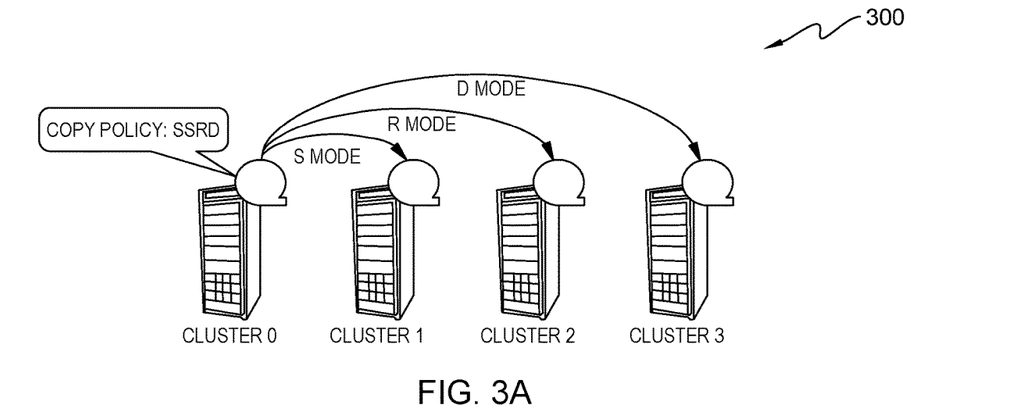
FIGS. 3A-D depict copy policies associated with example cluster grids, in accordance with an embodiment of the present invention.

FIG. 3A is a depiction of a copy policy associated with cluster grid 300 under normal circumstances, in accordance with an embodiment of the present invention. Cluster grid 300 comprises cluster 0, cluster 1, cluster 2 and cluster 3, wherein cluster 0 is the TVC, clusters 0 and 1 are assigned S mode, cluster 2 is assigned R mode and cluster 3 is assigned D mode. The respective copy policy of cluster grid 300, i.e., in order of the clusters, is SSRD.

Figure 3B:
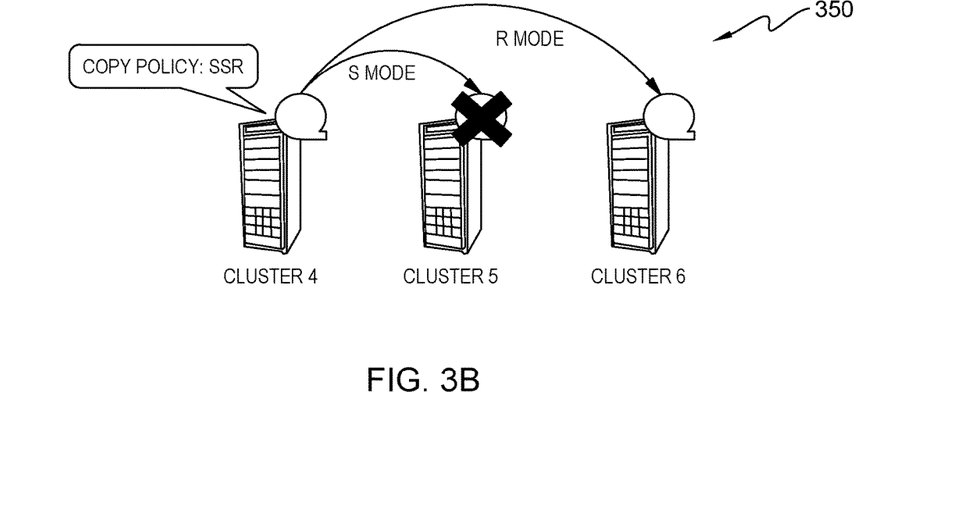

FIG. 3B is a depiction of a copy policy associated with cluster grid 350 with an offline S mode cluster, in accordance with an embodiment of the present invention. Cluster grid 350 comprises clusters 4, 5 and 6, having a respective copy policy of SSR and with cluster 4 as the TVC. Cluster 5, however, is offline, e.g., due to maintenance, a failure, a disaster, etc., and therefore a zero RPO cannot be achieved for cluster grid 350. Responsive to a detection of the offline status of cluster 5, copy policy modifier 104 (e.g., operational on cluster 4, the TVC) will swap the copy mode of the remaining available cluster, i.e., cluster 6, with cluster 5. Accordingly, the modified respective copy policy of cluster grid 350 will be SRS (not shown) to maintain a zero RPO for cluster grid 350.

Figure 3C:
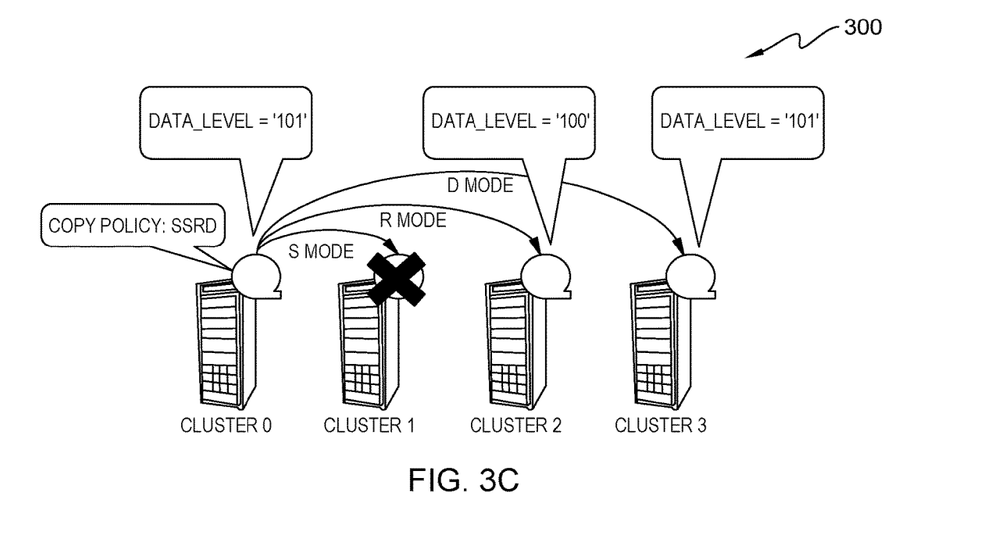

FIG. 3C depicts a copy policy associated with cluster grid 300 with an offline S mode cluster, in accordance with an embodiment of the present invention. Cluster 1, assigned Synchronous copy mode, is offline, i.e., unavailable, in FIG. 3C. Responsive to detecting that cluster 1 is offline, copy policy modifier 104, e.g., operating on cluster 0, looks to remaining available clusters, i.e., cluster 2 and cluster 3, for selecting a cluster for S mode assignment. Noticing that cluster 3 has the same data level as the TVC, i.e., data_level='101', cluster 3 is selected for S mode assignment to maintain a zero RPO for cluster grid 300. Copy policy modifier 104 therefore swaps the copy modes of cluster 1 and cluster 3 so that the modified respective copy policy of cluster grid 300 is SDRS (not shown), wherein cluster 2 is unaffected and keeps its copy mode, i.e., R mode.

Figure 3D:
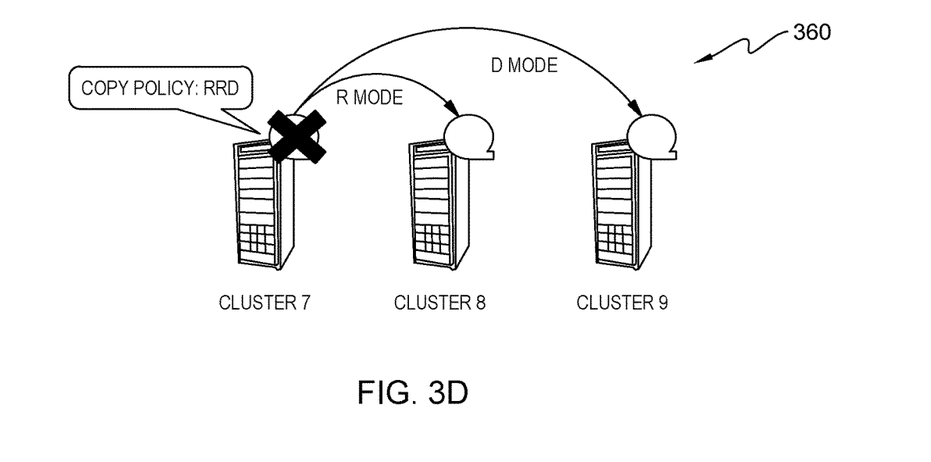

It should be noted that according to some embodiments, copy policy modifier 104 can modify a copy policy associated with a cluster grid having no clusters assigned S mode. FIG. 3D depicts a copy policy associated with cluster grid 360 having no clusters assigned to Synchronous copy mode, in accordance with an embodiment of the present invention. The respective copy policy for cluster grid 360 is RRD, wherein clusters 7 and 8 are assigned R mode and cluster 9 is assigned D mode and R mode is therefore a highest priority copy mode associated with cluster grid 360.

Responsive to detecting that cluster 7 is offline, copy policy modifier 104, e.g., operational on cluster 8, can swap the copy modes of cluster 7 and cluster 9, modifying the copy policy of cluster grid 360 to be DRR (not shown). Generally, the copy policy of a cluster grid can therefore be modified to have higher priority copy modes assigned to available clusters and lower priority copy modes assigned to offline clusters.

It should be noted that when an offline cluster comes back online, i.e., becomes available, any copy policy modification performed on the cluster grid associated with the cluster can be undone to restore a previous, e.g., preferred, copy policy of the cluster grid, in place prior to the cluster going offline and the copy policy being modified. For example, responsive to detecting that cluster 1 in FIG. 3C is back online, copy policy modifier 104 can swap the copy modes of clusters 1 and 3 again to restore the previous copy policy of cluster grid 300, e.g., SSRD. Alternatively, copy policy modifier 104 can be configured to maintain a modified copy policy even in the event that an offline cluster comes back online. For example, responsive to a detection that cluster 1 is back online in FIG. 3C, copy policy modifier 104 can maintain the copy policy associated with cluster grid 300 as the modified copy policy, e.g., SDRS.

Figure 4:
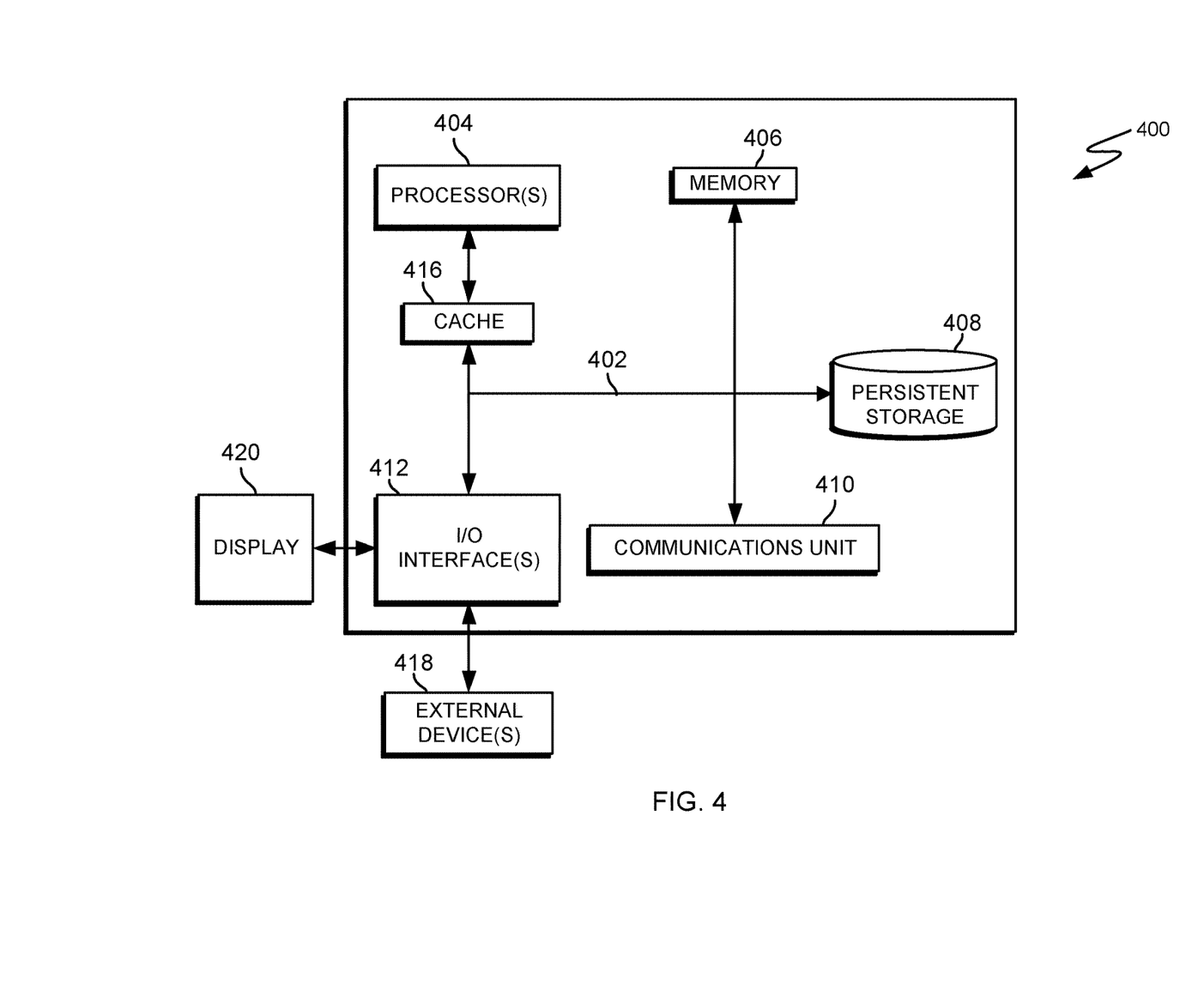
FIG. 4 is a block diagram of components of the server computer executing the copy policy modifier, in accordance with an embodiment of the present invention.

FIG. 4 depicts a block diagram of components of server computers 102A-N in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server computers 102A-N include communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Copy policy modifier 104 can be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 can provide communications through the use of either or both physical and wireless communications links. Copy policy modifier 104 can be downloaded to persistent storage 408 through communications unit 410.

I/O interface(s) 412 allows for input and output of data with other devices that can be connected to server computers 102A-N. For example, I/O interface 412 can provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., copy policy modifier 104, can be stored on such portable computer readable storage media and can be loaded onto persistent storage 408 via I/O interface(s) 412. I/O interface(s) 412 also connect to a display 420. Display 420 provides a mechanism to display data to a user and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for dynamically changing a copy policy associated with a cluster grid for tape storage virtualization to achieve zero recovery point objective (RPO), the method comprising:
   monitoring one or more statuses of a plurality of clusters associated with the cluster grid, wherein one or more of the plurality of clusters are assigned one of a plurality of copy modes;
   detecting that at least one of the plurality of clusters, having a highest priority copy mode associated with the cluster grid, is unavailable;
   selecting an available second cluster of the plurality of clusters; and
   changing the copy policy wherein the available second cluster is assigned the highest priority copy mode.

2. The method of claim 1, wherein the plurality of clusters comprise virtual tape storage and the plurality of copy modes comprise, in order of priority from high to low, a Synchronous mode, a RUN mode and a Deferred mode.

3. The method of claim 1, wherein changing the copy policy comprises swapping a copy mode, associated with the available second cluster, with the highest priority copy mode of the at least one of the plurality of clusters.

4. The method of claim 1, wherein selecting the available second cluster is based on at least one of a data level of the available second cluster and a priority associated with a copy mode of the available second cluster.

5. The method of claim 1, wherein a previous copy policy associated with the cluster grid is restored responsive to a detection that the at least one of the plurality of clusters is available.

6. A method for dynamically changing a copy policy associated with a cluster grid for tape storage virtualization to achieve zero recovery point objective (RPO), the method comprising:
- monitoring, by a tape volume cache (TVC) cluster which a client writes data to, one or more statuses of a plurality of clusters associated with the cluster grid, wherein one or more of the plurality of clusters are assigned one of a plurality of copy modes;
- detecting, by the TVC cluster, that at least one of the plurality of clusters having a Synchronous copy mode is unavailable;
- selecting, by the TVC cluster, an available second cluster of the plurality of clusters based on at least one of a data level of the available second cluster and a priority associated with a copy mode of the available second cluster; and
- changing, by the TVC cluster, the copy policy wherein the available second cluster is assigned the Synchronous copy mode.

7. The method of claim 6, wherein changing the copy policy comprises swapping a copy mode, associated with the available second cluster, with the Synchronous copy mode of the at least one of the plurality of clusters.

8. The method of claim 6, further comprising:
- copying, by the TVC cluster, a data level associated with the TVC cluster to the available second cluster, responsive to detecting that no available clusters of the plurality of clusters have a data level equal to the data level associated with the TVC cluster.

9. The method of claim 6, wherein some clusters of the plurality of clusters are exempt from selection based on predetermined criteria.

10. The method of claim 6, wherein a previous copy policy associated with the cluster grid can be restored responsive to a detection that the at least one of the plurality of clusters is available.

11. A computer program product for dynamically changing a copy policy associated with a cluster grid for tape storage virtualization to achieve zero recovery point objective (RPO), the computer program product comprising:
- one or more computer readable storage media and program instructions stored on the one or more computer readable storage media, the program instructions comprising:
  - program instructions to monitor one or more statuses of a plurality of clusters associated with the cluster grid, wherein one or more of the plurality of clusters are assigned one of a plurality of copy modes;
  - program instructions to detect that at least one of the plurality of clusters, having a highest priority copy mode associated with the cluster grid, is unavailable;
  - program instructions to select an available second cluster of the plurality of clusters; and
  - program instructions to change the copy policy wherein the available second cluster is assigned the highest priority copy mode.

12. The computer program product of claim 11, wherein the plurality of clusters comprise virtual tape storage and the plurality of copy modes comprise, in order of priority from high to low, a Synchronous mode, a RUN mode and a Deferred mode.

13. The computer program product of claim 11, wherein the program instructions to change the copy policy comprise swapping a copy mode, associated with the available second cluster, with the highest priority copy mode of the at least one of the plurality of clusters.

14. The computer program product of claim 11, wherein the program instructions to select the available second cluster are based on at least one of a data level of the available second cluster and a priority associated with a copy mode of the available second cluster.

15. The computer program product of claim 11, wherein a previous copy policy associated with the cluster grid is restored responsive to a detection that the at least one of the plurality of clusters is available.

16. A computer program product for dynamically changing a copy policy associated with a cluster grid for tape storage virtualization to achieve zero recovery point objective (RPO), the computer program product comprising:
- one or more computer readable storage media and program instructions stored on the one or more computer readable storage media, the program instructions comprising:
  - program instructions to monitor, by a tape volume cache (TVC) cluster which a client writes data to, one or more statuses of a plurality of clusters associated with the cluster grid, wherein one or more of the plurality of clusters are assigned one of a plurality of copy modes;
  - program instructions to detect, by the TVC cluster, that at least one of the plurality of clusters having a Synchronous copy mode is unavailable;
  - program instructions to select, by the TVC cluster, an available second cluster of the plurality of clusters based on at least one of a data level of the available second cluster and a priority associated with a copy mode of the available second cluster; and
  - program instructions to change, by the TVC cluster, the copy policy wherein the available second cluster is assigned the Synchronous copy mode.

17. The computer program product of claim 16, wherein the program instructions to change the copy policy comprise swapping a copy mode, associated with the available second cluster, with the Synchronous copy mode of the at least one of the plurality of clusters.

18. The computer program product of claim 16, further comprising:
- program instructions to copy, by the TVC cluster, a data level associated with the TVC cluster to the available second cluster, responsive to detecting that no available clusters of the plurality of clusters have a data level equal to the data level associated with the TVC cluster.

19. The computer program product of claim 16, wherein some clusters of the plurality of clusters are exempt from selection based on predetermined criteria.

20. The computer program product of claim 16, wherein a previous copy policy associated with the cluster grid can be restored responsive to a detection that the at least one of the plurality of clusters is available.

21. A computer system for dynamically changing a copy policy associated with a cluster grid for tape storage virtualization to achieve zero recovery point objective (RPO), the computer system comprising:
- one or more computer processors;
- one or more computer readable storage media;

program instructions stored on the one or more computer readable storage media for execution by at least one of the one or more processors, the program instructions comprising:

program instructions to monitor one or more statuses of a plurality of clusters associated with the cluster grid, wherein one or more of the plurality of clusters are assigned one of a plurality of copy modes;

program instructions to detect that at least one of the plurality of clusters, having a highest priority copy mode associated with the cluster grid, is unavailable;

program instructions to select an available second cluster of the plurality of clusters; and program instructions to change the copy policy wherein the available second cluster is assigned the highest priority copy mode.

22. The computer system of claim 21, wherein the plurality of clusters comprise virtual tape storage and the plurality of copy modes comprise, in order of priority from high to low, a Synchronous mode, a RUN mode and a Deferred mode.

23. The computer system of claim 21, wherein the program instructions to change the copy policy comprise swapping a copy mode, associated with the available second cluster, with the highest priority copy mode of the at least one of the plurality of clusters.

24. The computer system of claim 21, wherein the program instructions to select the available second cluster are based on at least one of a data level of the available second cluster and a priority associated with a copy mode of the available second cluster.

25. The computer system of claim 21, wherein a previous copy policy associated with the cluster grid is restored responsive to a detection that the at least one of the plurality of clusters is available.

* * * * *